United States Patent [19]
Ishida et al.

[11] Patent Number: 5,625,632
[45] Date of Patent: Apr. 29, 1997

[54] MAGNETIC DISK DRIVE INCLUDING A DATA DISCRIMINATION APPARATUS CAPABLE OF CORRECTING SIGNAL WAVEFORM DISTORTION DUE TO INTERSYMBOL INTERFERENCE

[75] Inventors: Yoshiteru Ishida, Chigasaki; Kazunori Iwabuchi, Yokohama; Hideyuki Yamakawa, Fujisawa; Hiromi Matsushige, Odawara, all of Japan

[73] Assignee: Hitachi, Ltd., Tokyo, Japan

[21] Appl. No.: 319,725

[22] Filed: Oct. 7, 1994

[30] Foreign Application Priority Data

Oct. 8, 1993  [JP]  Japan .................... 5-253336

[51] Int. Cl.$^6$ .......................... G06F 11/10; H03M 13/00
[52] U.S. Cl. ........................................ 371/43; 371/6
[58] Field of Search ........................... 371/30, 31, 6, 371/41–45; 340/46, 146.2; 360/45–47, 51, 65

[56] References Cited

U.S. PATENT DOCUMENTS

| | | | |
|---|---|---|---|
| 3,621,139 | 11/1971 | Gibson | 371/37.1 |
| 4,514,854 | 4/1985 | Ashida | 371/6 |
| 4,958,140 | 9/1990 | Yasuda et al. | 340/146.2 |
| 5,313,472 | 5/1994 | Hara | 371/6 |
| 5,467,232 | 11/1995 | Ouchi et al. | 360/65 |

FOREIGN PATENT DOCUMENTS 3-284014  12/1991  Japan .
4-207708  7/1992  Japan .

*Primary Examiner*—Paul P. Gordon
*Assistant Examiner*—Thomas E. Brown
*Attorney, Agent, or Firm*—Antonelli, Terry, Stout & Kraus, LLP

[57] ABSTRACT

A data discrimination apparatus which is capable of correcting a decrease in amplitude of a signal to be data discriminated by a correction value so as to correct the bit itself which was used as a target bit to determine the correction value. A decision circuit preliminarily classifies an equalizer output into symbols "0" and "1" to obtain a run length of the symbol "0" with respect to a given symbol "1" (the target bit). A correction value generating circuit includes a memory device which contains correction values in correspondence with all the possible values of the run length, and outputs one of the correction values out of the memory device in response to an output from the decision circuit. A delay circuit delays the equalizer output by a time which is required until the correction value is output. An operation circuit adds the selected correction value to the delayed equalizer output, to correct the same. The thus corrected equalizer output is data discriminated in a data discrimination circuit, with a lowered error rate owing to the correction.

17 Claims, 12 Drawing Sheets

FIG.9

| DATA IN SHIFT REG.82 | | | | | ADDRESS |
|---|---|---|---|---|---|
| +2 | +1 | 0 | -1 | -2 | |
| H | H | L | H | H | 4 |
| H | H | L | H | L | 3 |
| H | H | L | L | H | 2 |
| H | H | L | L | L | 2 |
| H | L | L | H | H | 2 |
| H | L | L | H | L | 1 |
| H | L | L | L | H | 0 |
| H | L | L | L | L | 0 |
| L | H | L | H | H | 3 |
| L | H | L | H | L | 2 |
| L | H | L | L | H | 1 |
| L | H | L | L | L | 1 |
| L | L | L | H | H | 2 |
| L | L | L | H | L | 1 |
| L | L | L | L | H | 0 |
| L | L | L | L | L | 0 |
| * | * | H | * | * | 5 |

H ⋯ HIGH("0")

L ⋯ LOW("1")

* ⋯ HIGH OR LOW

MAGNETIC DISK DRIVE INCLUDING A DATA DISCRIMINATION APPARATUS CAPABLE OF CORRECTING SIGNAL WAVEFORM DISTORTION DUE TO INTERSYMBOL INTERFERENCE

BACKGROUND OF THE INVENTION

1. Field of the Invention

The present invention generally relates to a digital data recording/reproducing apparatus for recording digital data at a high recording density, and particularly to a data discrimination apparatus for correcting a reproduced signal influenced by the interference occurring between adjacent bits, an amount of which varies depending upon input data patterns (a frequency of changes of the signal level or an interval between a symbol "1" and a subsequent symbol "1").

2. Description of the Related Art

In a digital data recording/reproducing apparatus, such as a magnetic recording apparatus using a disk-like recording medium (i.e., inter-symbol), it is known that a reproduced signal waveform suffers from a non-linear distortion or decrease of amplitude thereof because of a so-called inter-symbol interference occurring between adjacent bits which are in close proximity to each other in the recorded signal. This may be particularly significant when the recording density of the medium becomes higher.

A waveform equalizing technique used in an adaptive equalizer or a decision-feedback equalizer is a prior art approach to compensate for the non-linear distortion (e.g., a horizontally non-symmetrical waveform) of the signal waveform and the decrease in amplitude due to the interference. An example of the adaptive equalizer is shown in Japanese patent application laid-open (KOKAI) No. 4-207708, in which when a code in an output signal from a transversal filter is different from an immediately preceding or succeeding code, a decision error is derived from the output signal to update tap coefficients of the equalizer. An example of the decision-feedback equalizer is shown in Japanese patent application laid-open (KOKAI) No. 3-284014, in which each of the tap coefficients is determined and corrected by using the LMS (Least Mean Square) algorithm based on an error signal between the input and the output of a decision unit, and signals of respective taps of forward and backward equalizers.

Referring to FIG. 14, there is shown a construction of such an adaptive equalizer. Representing an input, an output and tap coefficients of the equalizer by "x", "y" and "h", respectively, an assumption is made such that input and output data x and y are considered as data at the same time point, with "k" being a reference time point. The block labeled "ADAPTIVE ALGORITHM" serves to update the tap coefficients $h_0$–$h_{N-1}$ based on error data $e(k)=d(k)-y(k)$, where $d(k)$ indicates an expected value. It is also assumed that no clock delay occurs in this block. An output of the equalizer obtained based on the thus updated tap coefficients $h_0$–$h_{N-1}$ is data $y(k+1)$ at a time of one clock later, which corresponds to input data $x(k+1)$.

These prior art techniques have the following drawbacks: With the conventional recording density of about 50k fci (flux change per inch), whether data has loose or fine intervals of adjacent bits makes almost no difference to an amount of interference. However, when the recording density becomes higher and higher in future, the interference occurring at the fine interval becomes greater, whereas that at the loose interval remains intact. Therefore, an amount of interference varies depending upon the input data patterns, causing larger variations of the non-linear distortion of the signal waveform and a decrease of the amplitude.

As mentioned above, the prior art equalizer controls the tap coefficients (i.e., equalizer characteristics) so as to minimize an error between the expected value and the equalizer output. Feedback is effected not from the data used for the decision, i.e., the expected value and the equalizer output, but from data at a time after the reference time, $x(k+1)$. Here, the term "feedback" is used to represent that the tap coefficients are updated to be used to affect the equalizer output. With this arrangement of the prior art equalizer, it is impossible to correct, in a bit-by-bit manner, the non-linear distortion or decrease in amplitude of the signal waveform which varies depending upon the input data patterns. In this specification, "adjacent bits" refer to two or more symbol "1"'s which are close with each other within a range of a certain number of bits.

SUMMARY OF THE INVENTION

An object of the invention is to provide a data discrimination apparatus which is, dependent upon changes in an amount of inter-symbol interference occurring between adjacent bits of recorded data, capable of correcting the amount of inter-symbol interference in a bit-by-bit manner.

According to an aspect of the present invention, there is provided a data discrimination apparatus for outputting a bit stream including logical "1" and "0" in response to an input signal representative of bi-level data, comprising: a decision circuit for detecting an amplitude of the input signal at regular sampling intervals so as to preliminarily classify, based on the detected amplitude, each of the sampled parts of the input signal into one of either a symbol "1" indicative of a large amplitude part or a symbol "0" indicative of a small amplitude part, and for deciding, when a pertinent sampled part is classified into symbol "1", whether each of a predetermined number of sampled parts at least preceding in time the pertinent sampled part is symbol "1" or "0"; a correction value generation circuit responsive to an output of the decision circuit for generating one of correction values of an amplitude of the input signal, the correction values being predetermined corresponding to different combinations of the symbols of the predetermined number of sampled parts; a delay circuit for delaying the input signal by a predetermined time; an operation circuit for adding, to the input signal delayed by the delay circuit, a signal indicative of one of the correction values generated from the correction value generating circuit; and a discrimination circuit responsive to an output of the operation circuit for discriminating the input signal so as to output the bit stream including logical "1" and "0".

The correction value generating circuit determines a correction value with respect to a pattern of the input signal, i.e., a different combinations of symbols for the predetermined number of sampled parts, thereby providing correction values corresponding to individual patterns of the input signal. The delay circuit is to delay the input signal by the length of time which it takes until the correction value is output from the correction value generating circuit. The output from the delay circuit is corrected by the correction value so as to correct the bit itself which was used to determine the correction value, thus achieving the aforementioned object of the present invention. The discrimination circuit discriminates each of the sampled parts of the corrected input signal into logical "1" or "0" of bi-level digital data.

BRIEF DESCRIPTION OF THE DRAWINGS

FIG. 9 shows a table for explaining determination of an address number in a decoder shown in FIG. 8;

DETAILED DESCRIPTION OF THE PREFERRED EMBODIMENTS

Figure 1:
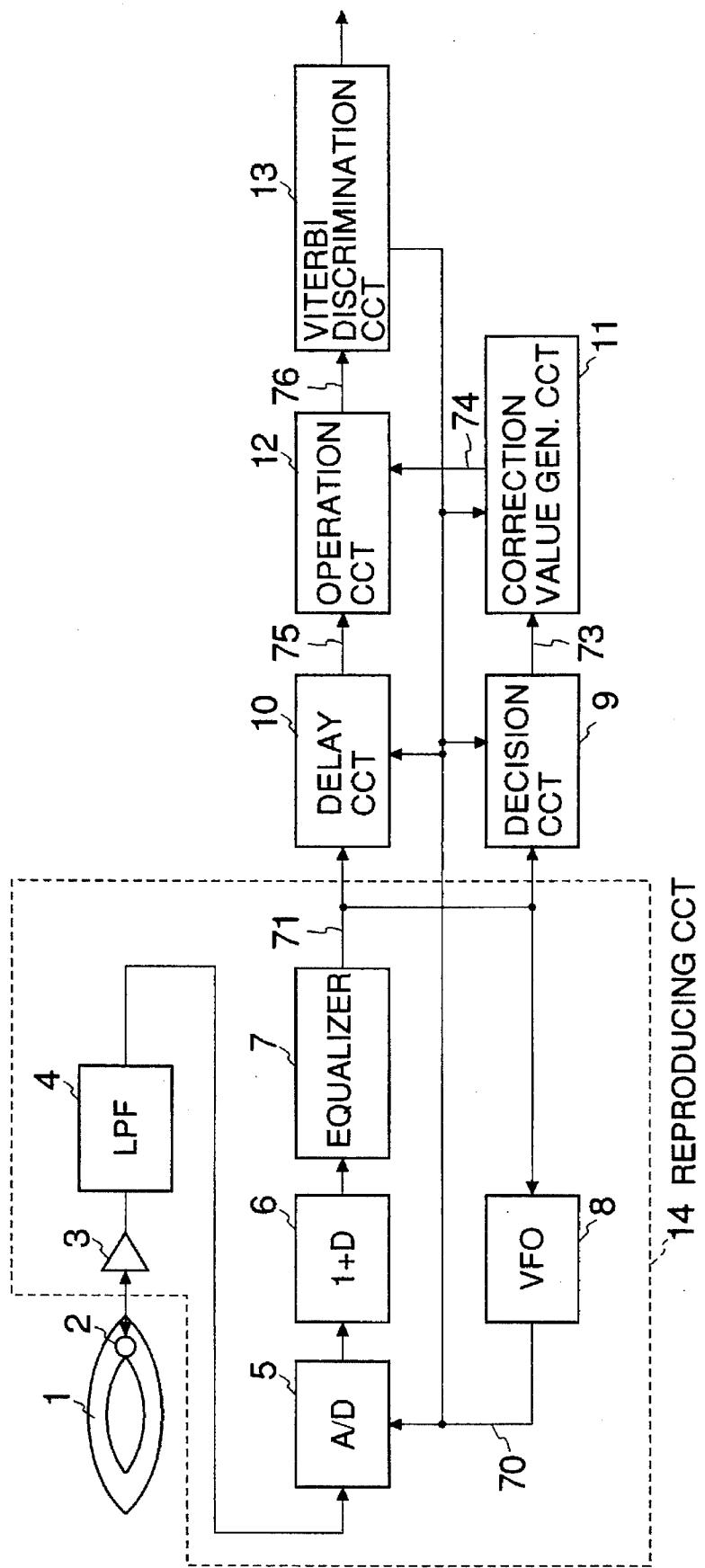
FIG. 1 shows a block diagram of an embodiment of a digital data reproducing circuit according to the present invention.

Referring first to FIG. 1 which shows a block diagram of a digital data reproducing circuit, a first embodiment of the present invention will be explained below.

In FIG. 1, reference numerals 1, 2 and 3 indicate a recording medium, a magnetic head and a pre-amplifier, respectively. Reference numerals 4, 5 and 6 indicate, respectively, a low-pass filter (LPF), an analog-to-digital converter (A/D) and a (1+D) operation circuit where D is a unit delay operator. The (1+D) operation circuit 6 is a circuit for the pre-processing of a Viterbi discrimination circuit 13 which is described below. Reference numerals 7, 8 and 9 indicate an equalizer circuit, a variable frequency oscillator (VFO) and a decision circuit, respectively. Also, indicated by reference numerals 10, 11, 12 and 13 are a delay circuit, a correction value generating circuit, an operation circuit, and a Viterbi discrimination circuit. The Viterbi discrimination circuit 13 is known as a Viterbi decoder which was originally created for decoding a convolution code, and is used, in the digital data reproducing apparatus, together with a reproducing circuit 14 which is a prior art circuit. The combination of the Viterbi decoder and the digital data reproducing apparatus is disclosed in Nikkei Electronics, 1991, 9.30 (no. 537), pp. 90–92.

This is an embodiment in which the present invention has been applied to a reproducing circuit of a digital disk apparatus, and is constructed based on the following idea: In the magnetic disk drive, analog data output from the magnetic head 2 is sampled at regular intervals according to a sampling clock in the analog-to-digital converter 5 which is placed at the stage following the magnetic head 2, so as to produce digital data to be discriminated. The decrease in amplitude or non-linear distortion of the analog data is contained in this digital data in the form of dispersed sampled values at the sampling points. Thus, it is possible to eliminate the non-linear distortion by providing means for correcting the amplitude of the digital data or sampled values.

To this end, first, the decision circuit 9 is provided to preliminarily classify the data output from the equalizer 7, which is a prior art waveform shaping circuit, into symbols "0" and "1" so as to obtain a run length of the symbol "0". Secondly, a memory 51 (FIG. 5) is provided in the correction value generating circuit 11, which stores correction values corresponding to all of the possible values of the run length. The correction generating circuit 11 responds to a value of the run length given from the decision circuit so as to read a corresponding correction value out of the memory 51. In addition, the delay circuit 10 is provided to delay the data output from the equalizer 7 by the same time as the decision circuit 9 and the correction value generating circuit 11 require for their sequential processing. That is, the delay circuit 10 provides a delay time which is equal to the time from when a bit was output from the equalizer 7 until when a correction value for that bit is issued from the correction value generating circuit 11, thereby assuring an appropriate timing between the equalizer output and the correction value output. Further, the operation circuit 12 is provided for adding the output from the delay circuit 10 to the output from the correction value generating circuit 11 (i.e., a selected correction value). With these circuits, it becomes possible to correct a value of a sampled bit by a correction value, the sampled bit being the same bit which has just been used as a target bit for obtaining that correction value.

Referring still to FIG. 1, the embodiment will be explained in detail hereinafter. In this embodiment, data is recorded on the digital disk in the Non-Return to Zero Inverted (NRZI) format. The signal issued from the magnetic head 2 is amplified by the pre-amplifier 3 and processed in the low-pass filter 4 so as to eliminate noise in a high frequency band. The thus processed signal is then applied to the analog-to-digital converter 5 in which the signal is sampled according to a VFO clock which is generated by the VFO 8. The sampled data is processed in the (1+D) operation circuit 6 in which current sampled data is added to sampled data one clock prior to the current sampled data. The output from the (1+D) circuit is waveform-equalized in the equalizer 7, the output of which is then applied to the VFO 8, the decision circuit 9 and the delay circuit 10. The VFO 8 creates a VFO clock from the equalized data output. The decision circuit 9 preliminarily classifies samples in the equalized data into bi-level data or symbols "1" and "0" (alternatively, into tri-level data or symbols "1", "0" and "−1"), and counts the number of consecutive symbol "0"s (i.e., run length of "0"). As mentioned above, the correction value generating circuit 11 contains therein correction values corresponding to all the possible values of the run length of the symbol "0" which can possibly be present in the equalized data, and outputs a selected correction value which corresponds to a value of the run length issued from the decision circuit 9. Delayed in the delay circuit 10 by the time which is required for the sequential processing of the decision circuit 9 and the correction value generating circuit 11, the equalized data is added to the selected correction value from the correction value generating circuit 11. The thus corrected data is used for the data discrimination process in the Viterbi discrimination circuit 13. The individual circuits described above are synchronized with the VFO clock from the VFO 8.

The embodiment shown in FIG. 1 makes it possible to add a correction value corresponding to a value of the run length of the symbol "0" to the bit data which has just been used for obtaining the correction value, in order to use the corrected data for the data discrimination. With this arrangement, the variation of an amount of the inter-symbol interference due to the various data patterns in the high-density recording is cancelled. Moreover, the addition of the correction value increases the amplitude of sampled data, improving the signal-to-noise (S/N) ratio. As a result, a rate of occurrence of discrimination errors in the Viterbi discrimination circuit 13 will be reduced.

Figure 2:
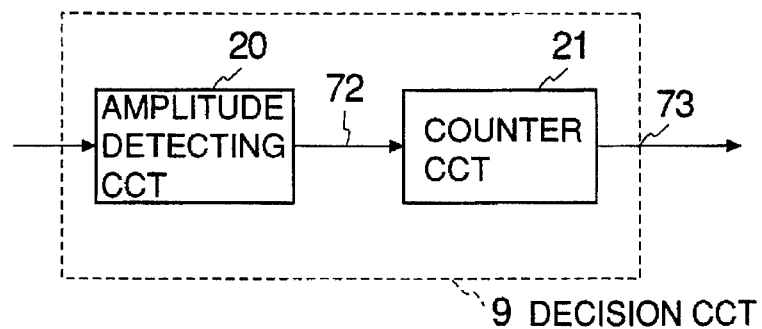
FIG. 2 shows an example of a decision circuit.

Referring now to FIG. 2 and the subsequent Figures, several blocks shown in FIG. 1 will sequentially be described in detail. It should be noted that the signal line of the VFO clock is not shown in the Figures except FIG. 1.

FIG. 2 shows a block diagram of a specific example of the decision circuit 9. The decision circuit 9 includes an amplitude detecting circuit 20 and a counter circuit 21. The equalized data from the equalizer 7 (FIG. 1) is, initially in the amplitude detecting circuit 20, preliminarily classified into symbols "1" and "0" (or "1", "0" and "−1"). One specific example of the classification carried out in the amplitude detecting circuit 20 will be explained below with reference to FIG. 3.

Figure 3:
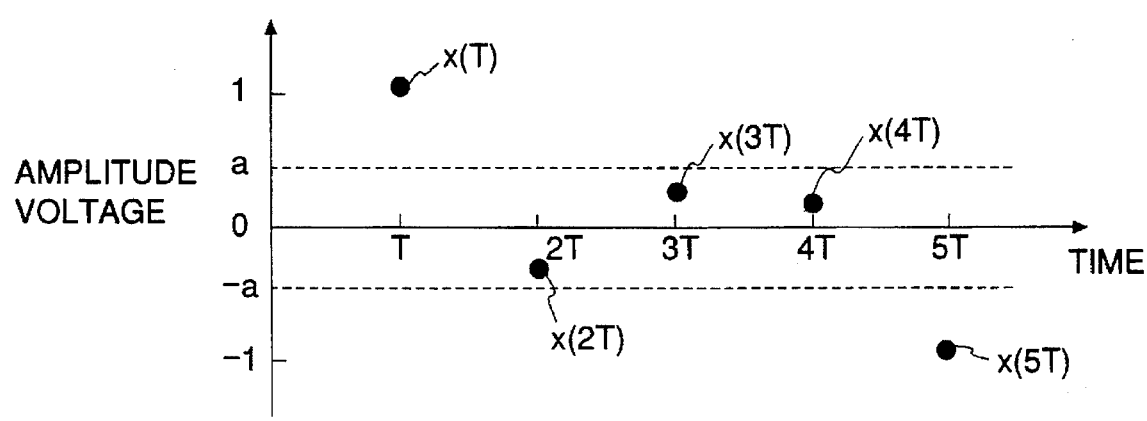
FIG. 3 shows a timing chart for explaining a method of preliminarily classifying input data.

In FIG. 3, letting threshold voltages be "a" and "−a", it is assumed that signal data having amplitude values x(T) to x(5T) indicated by black circles in FIG. 3 has been received from a time T to a time 5T, respectively, where "T" denotes a sampling interval, "x(nT)" denotes a value of amplitude data and "n" denotes an integer. The amplitude data x(nT) is compared with the two threshold voltage levels "a" and "−a". If x(nT)>a or x(nT)<−a, then the sample having this amplitude data is preliminarily classified into the symbol "1", indicating that the sample is a large amplitude part of the input signal. On the other hand, if −a≦x(nT)≦a, then the sample is preliminarily classified into the symbol "0", indicating that the sample is a small amplitude part of the input signal. The result of the classification will be "10001" in the example shown in FIG. 3. Alternatively, when the classification is performed such that if x(nT)>a, then the symbol is "1", if −a≦x(nT)≦a, then the symbol is "0", and if x(nT) <−a, then the symbol is "−1", the result will be "1000−1".

Referring back to FIG. 2, upon receipt of such a classification result, the counter circuit 21 counts the number of consecutive symbol "0"'s, or run length of the symbol "0". The counter circuit 21 outputs a value outside a range of possible values of the run length during a time when counting "0", whereas when a value of the run length is settled, the value ("3" in the case of FIG. 3) is output until the next clock is received. In a case where the possible values of the run length are 0 to 4, for example, a value "5" is used as the value outside the range. The counter circuit 21 is then reset when an input of symbol "1" or "−1" is received.

Figure 4:
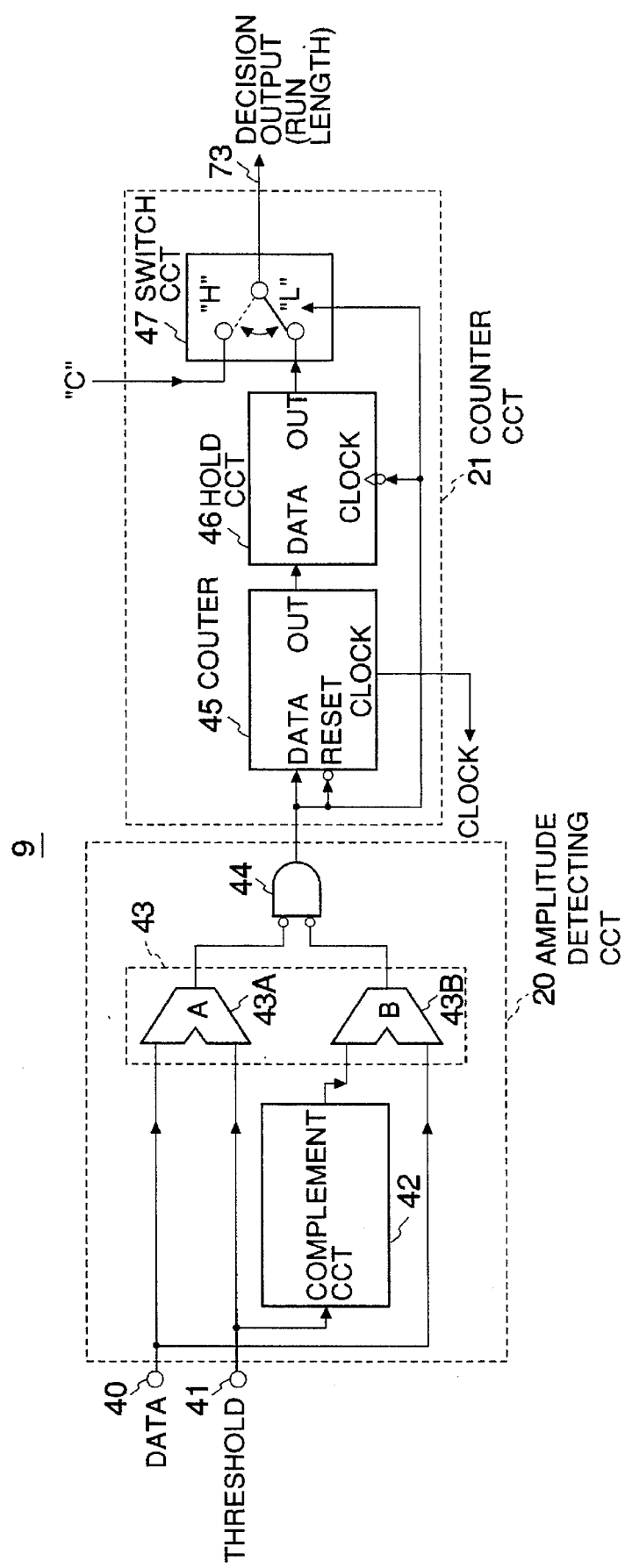
FIG. 4 shows, in a specific form, a block diagram of the circuit shown in FIG. 2.

Referring to FIG. 4, there is shown a block diagram of the decision circuit 9 in which the circuits in FIG. 2 are depicted in a more detailed form. Indicated at 40 and 41 are a data input terminal and a threshold input terminal, respectively. The amplitude detecting circuit 20 includes a complement circuit 42, comparators 43A and 43B, and a NOR circuit 44.

The counter circuit 21 includes a counter 45, a hold circuit 46 and a switch circuit 47. In the amplitude detecting circuit 20, the complement circuit 42 generates a complement value ("−a") of the threshold "a" which is given at the input terminal 41. The comparator 43A compares a value "x" of amplitude data at the input terminal 40 with the threshold "a", and generates a HIGH level signal if x>a, while otherwise it generates a LOW level signal. Similarly, the comparator 43B compares a value "x" of amplitude data at the input terminal 40 with the threshold "−a", and generates a HIGH level signal if x<−a, while otherwise generating a LOW level signal. The outputs of the comparators 43A and 43B are logically operated, or NORed by the NOR circuit 44. As a result, the output of the amplitude detecting circuit 20 becomes high in response to incoming amplitude data which meets a condition of −a≦x≦a, and becomes low in response to such data which meets a condition of x>a or x<−a. In the counter circuit 21, the counter 45 increments its count by one according to an incoming CLOCK signal when its DATA input remains high (corresponding to symbol "0"). When the DATA input becomes low, the counter 45 is reset to zero. The hold circuit 46 holds and outputs the count of the counter 45 when its CLOCK input terminal receives a LOW level signal (corresponding to symbol "1") from the NOR circuit 44. A HIGH level output from the amplitude detecting circuit 20 causes the switch circuit 47 to select a value "c" which is the value outside the range of the possible values of the run length, whereas a LOW level output causes that circuit to select the output value from the hold circuit 46. In this manner, the decision circuit 9 performs a preliminary classification of data to generate a value of run length of the symbol "0".

Figure 5:
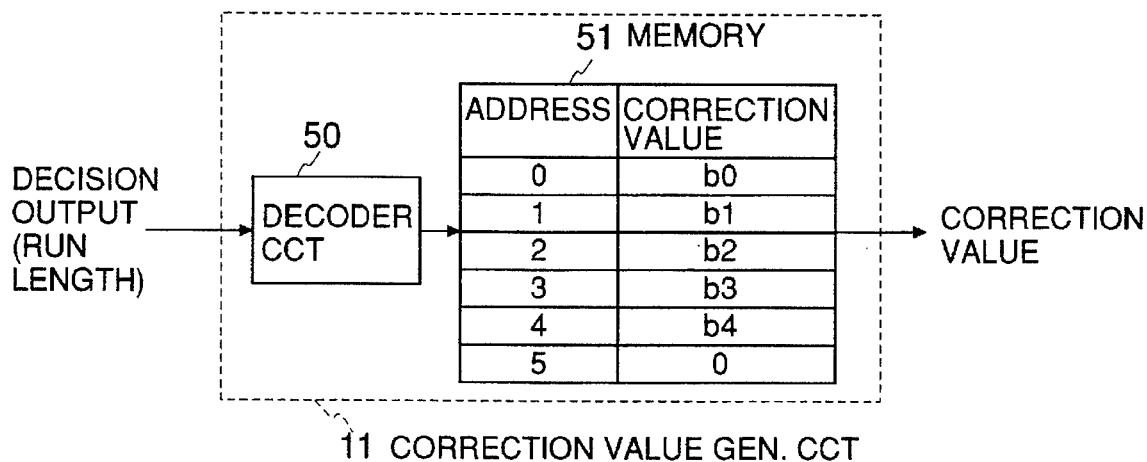
FIG. 5 shows an example of a correction value generating circuit shown in FIG. 1.

Referring next to FIG. 5, an explanation will be given of the correction value generating circuit 11 which is shown in FIG. 1. FIG. 5 shows a specific exemplary structure of the circuit 11 in which the equalized data takes 0, 1, 2, 3 or 4 as a value of the run length of the symbol "0". Reference numerals 50 and 51 indicate a decoder circuit 50 and a memory 51, respectively. The memory 51 contains correction values b0, b1, . . . , b4 at addresses 0 to 4, respectively which correspond to the respective possible values of the run length of symbol "0". The memory 51 also contains, at an address 5, a correction value "0" in correspondence with the value of the run length outside the range of the possible values. The correction values b0–b4 are to correct amplitude data indicated by the symbols "1" and "−1" and no correction is made to the amplitude data indicated by the symbol "0". In general, a larger value of the run length of the symbol "0" placed between two symbols of opposite polarity, i.e., the symbols "1" and "−1", will produce a lower amount of inter-symbol interference, keeping the amplitude of the equalized data, which assures an accurate data discrimination in the Viterbi discrimination circuit 13. For this reason, the correction values b0 to b4 have a relationship expressed by: b0>b1>b2>b3>b4. Incidentally, it may happen due to the (1+D) operation, that the same symbol "1" or "−1" appears twice consecutively in the equalized data, which provides a value "0" of the run length of the symbol "0" with respect to the second symbol "0". This will, however, cause no problem because the addition of the correction value increases the amplitude data, serving to enhance the performance of the Viterbi discrimination circuit 13.

Figure 13:
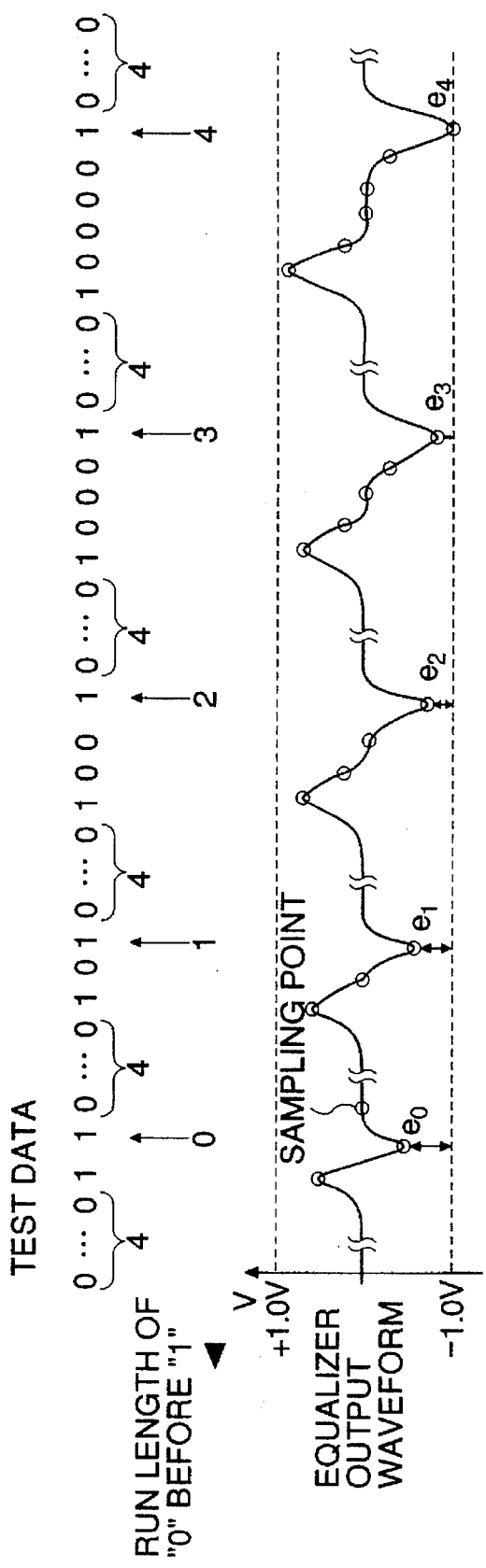
FIG. 13 shows a timing chart for explaining a determination of correction values of an amplitude of an input signal.
Figure 14:
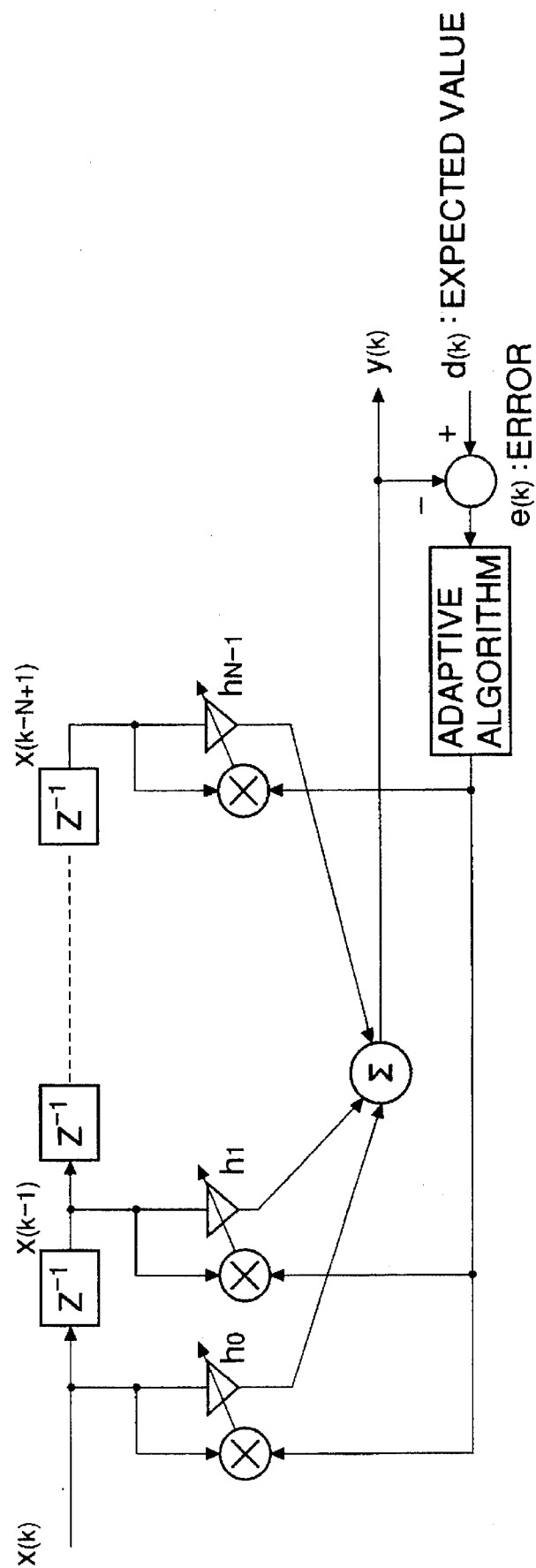
FIG. 14 shows a block diagram of a prior art adaptive equalizer.

Now, an explanation will be given of how the correction values b0–b4 are determined in correspondence with the values of the run length of the symbol "0". As mentioned above, it is assumed that the range of values of the run length is from 0 to 4. Each correction value depends upon the number of consecutive symbol "0"'s immediately preceding a given symbol "1". Therefore, before shipping out a product of the magnetic disk drive, it is tested with test data to determine errors of amplitude data with respect to the possible values of the run length of the symbol "0". In a case where voltages of the amplitude data corresponding to the symbols "1" and "−1" of the output waveform from the equalizer 7 are designed to be equal to +1 volt and −1 volt, respectively, the errors to be determined are the differences between the actually measured voltages of the amplitude data corresponding to the symbols "1" or "−1", and +1 volt or −1 volt, respectively. Thus, the correction values are determined as values proportional to the errors, with respect to the possible values of the run length. FIG. 13 is provided in order to explain the way of determining the correction values. The test data is selected to include all the possible values of the run length of the symbol "0". In this test, the amplitude values of negative peaks of the waveform issued from the equalizer 7 are measured, and the differences between the measured voltages and −1 volt are obtained as errors e0–e4. From this measurement, the correction values b0–b4 are determined as: b0=K0×e0, b1=K1×e1, ..., b4=K4×e4, where K0–K4 are weighting factors. Whether K0=K1=K2=K3=K4 or K0≠K1≠K2≠K3≠K4 is determined statistically.

The thus determined correction values can be used without change in other products. Alternatively, it is possible to determine the correction values for the individual products, or to change them for individual cylinders of a disk or for individual heads of a magnetic disk drive. Which is selected depends upon to what extent the reliability of the apparatus is needed, or the capacity of the memory (51 in FIG. 5).

Referring back to FIG. 5, the decoder circuit 50 receives data indicative of a value of the run length which is an output of the decision circuit 9. The decoder circuit 50 selects one of the addresses of the memory 51 in response to the value of the run length. For instance, an output value "3" of the decision circuit 9 will cause the decoder circuit 50 to select an address "3" at which correction value "b3" is stored in the memory 51. Also, an output value of the decision circuit 9, indicative of the value outside the range will cause the decoder circuit 50 to select an address "5" at which a correction value "0" is stored. With such an address being designated, the memory 51 outputs the correction value such as "b3" or "0".

As described above, by combining the decision circuit 9 and the correction value generating circuit 11, a data pattern can be expressed by a value of the run length of the symbol "0" and in response to the value of the run length, a correction value can be defined with respect to amplitude data indicated by the symbol "1" or "−1". With this correction value, the change of an amount of inter-symbol interference depending upon various data patterns can be absorbed.

Figure 6:
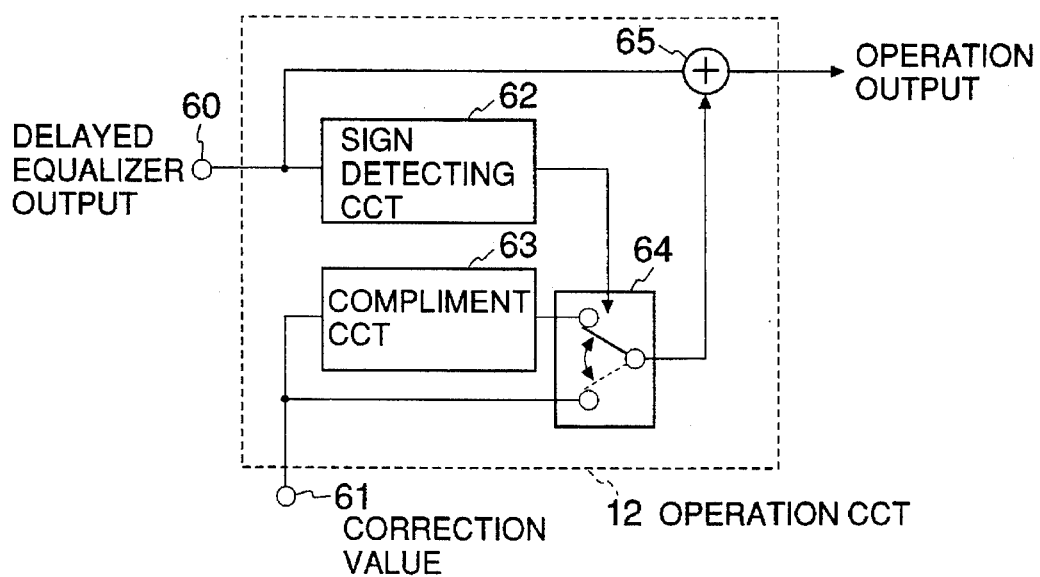
FIG. 6 shows an example of an operation circuit shown in FIG. 1.

Referring next to FIG. 6, the operation circuit 12 shown in FIG. 1 will be described in detail. FIG. 6 shows a specific exemplary structure of the operation circuit 12 which includes a delay data input terminal 60, a correction value input terminal 61, a sign detecting circuit 62, a complement circuit 63, a switch circuit 64, and an adder 65. The input terminal 60 receives an output from the equalizer 7 (FIG. 1) which was delayed by the delay circuit 10. The sign of this delayed data (sampled data) is checked in the sign detecting circuit 62. On the other hand, the input terminal 61 receives a correction value from the correction value generating circuit 11 (FIG. 1). The complement value of the correction value is created by the complement circuit 63. The switch circuit 64 receives the correction value and its complement, and selects one of the two in response to the resultant output of the sign detecting circuit 62. More specifically, if a sample of the delayed data is positive, the correction value itself is selected, while if the sample is negative, the complement value of the correction value is selected. The adder 65 adds the output from the switch circuit 64 to the sample of the delayed data received at the terminal 60, and the sum is issued as an output of the operation circuit 12.

Figure 7:
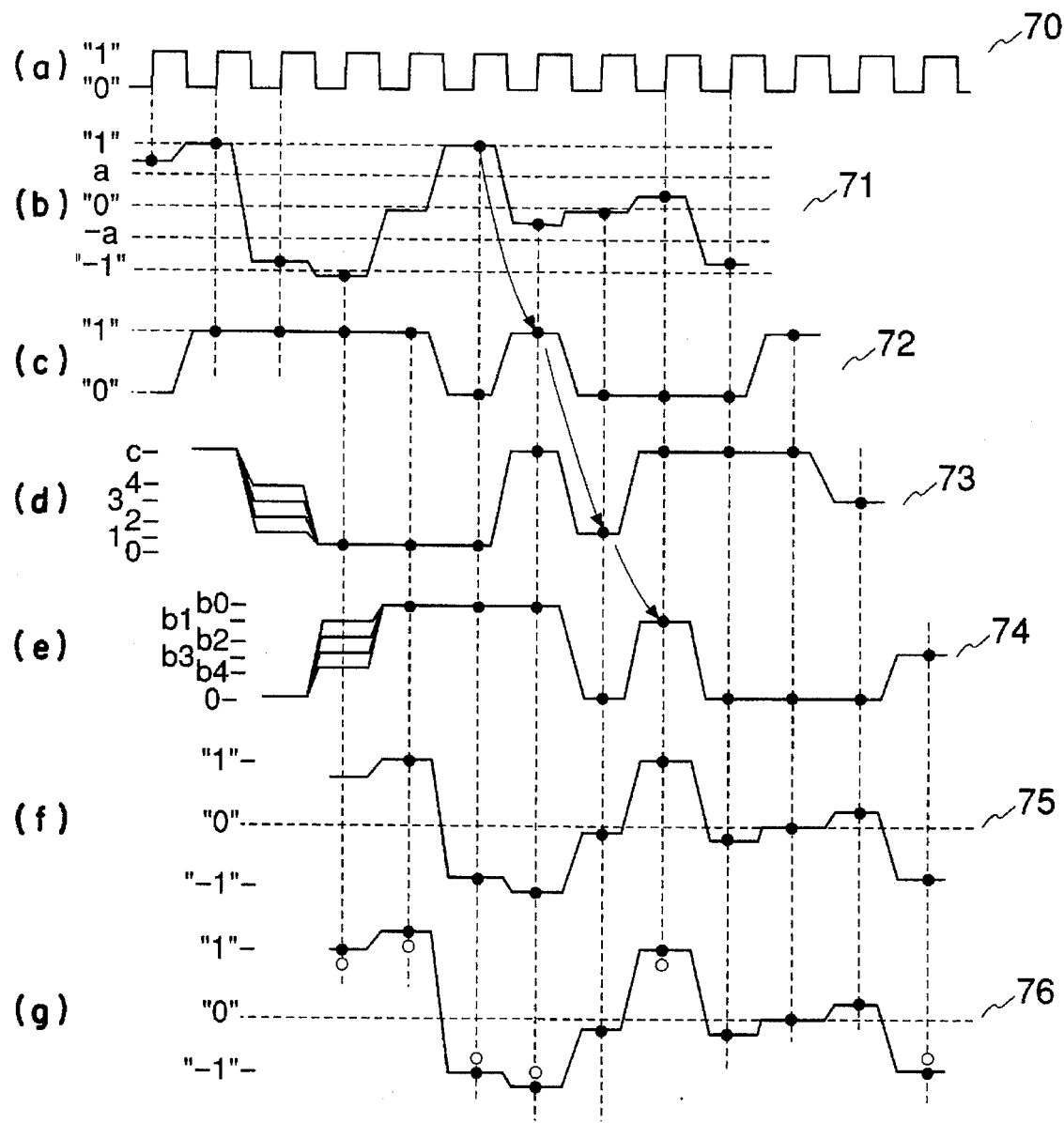
FIG. 7 shows a timing chart for explaining correction of an amplitude data.

FIG. 7 shows a timing chart for explaining a specific example of correction of the amplitude data. Reference numeral 70 indicates a VFO clock issued from the VFO circuit 8, which is a reference clock in synchronization with which the apparatus operates. Reference numeral 71 indicates an output of the equalizer 7 (FIG. 1) which contains equalization errors to be corrected. The values "a" and "−a" indicate the threshold values as described above. Reference numeral 72 indicates a waveform of the output of the amplitude detecting circuit 20 (FIG. 2) in the decision circuit 9 (FIG. 1), which in this case preliminarily classifies the sampled values of the waveform 71 into a bi-level signal or the symbols "1" and "0". Reference numeral 73 indicates an output of the counter circuit 21 (FIG. 2) in the decision circuit 9 (FIG. 1), which represents values of the run length of the symbol "0". During the time when the output is "c", the counter circuit 21 is counting the symbol "0". Reference numeral 74 indicates an output of the correction value generating circuit 11 (FIG. 1) which represents various correction values selected according to the values of the run length 73. Reference numeral 75 indicates an output of the delay circuit 10 (FIG. 1) which is the same waveform as that indicated at 71. Reference numeral 76 indicates an output of the operation circuit 12 (FIG. 1) which has been corrected with the correction values, where the white circles indicate uncorrected samples while the black circles indicate corrected samples. It should be noted that a correction value is added to data of a bit which has just been used as a target bit for obtaining that correction value. In this manner, a correction is made to sampled data indicated by the symbols "1" and "−1", according to the values of the run length of the symbol "0".

In a case where the equalization error at the equalizer 7 is large, the value of the run length of the symbol "0" obtained by the decision circuit 9 could be erroneous. This would, however, be the case where the amplitude value of sampled data, which is to be classified into the symbol "1" or "−1", decreases and is incorrectly classified into the symbol "0". Even if the sampled data to be classified into "1" or "−1" is erroneously classified into "0", this would have no effect, because no correction is made to the data classified into the symbol "0" in the present embodiment.

As discussed above, it is possible to improve the S/N ratio of data by feeding back a correction value, which cancels the changes of an amount of the inter-symbol interference produced depending upon various data patterns, to the bit which was used to obtain the correction value. Also, this will reduce the bit error rate in the Viterbi discrimination circuit.

The data discrimination is carried out by the Viterbi discrimination circuit in the above embodiment. Alternatively, a data discrimination circuit such as a level slice circuit may be used, which discriminates bit data by comparing an amplitude level of the sampled data with threshold levels. In addition, although the input signal to the Viterbi discrimination circuit is corrected in the above embodiment, a decision level used in the discrimination circuit may be corrected.

Figure 8:
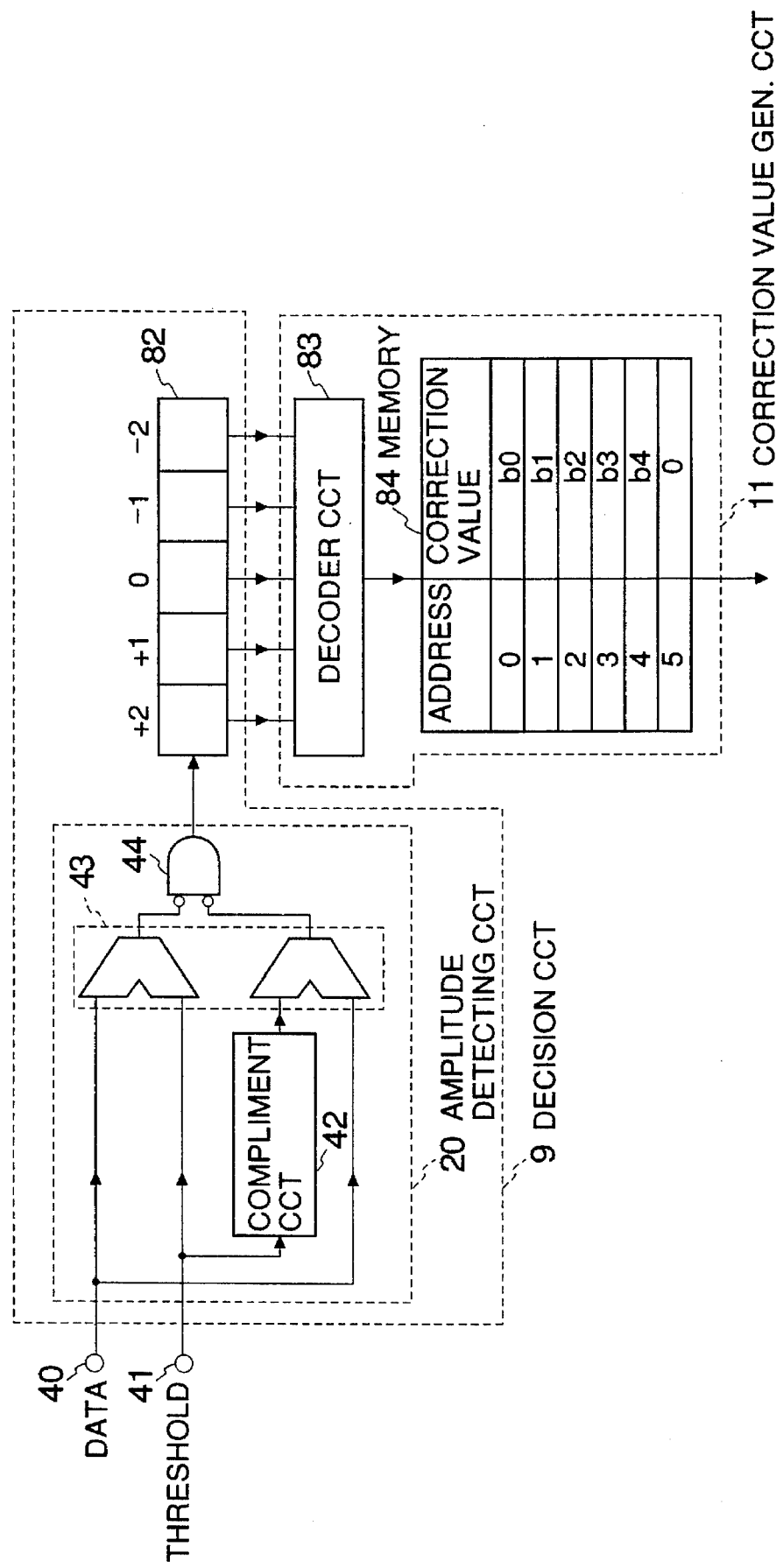
FIG. 8 shows another embodiment of the present invention with another exemplary structure of the decision circuit and the correction value generating circuit.

In the first embodiment described above, a correction value for correcting a target bit of the symbol "1" or "−1" is derived from the data (symbol "0") preceding in time the target bit, or the past bit data with respect to the target bit. Referring now to FIG. 8, a second embodiment of the invention will be described hereinafter, in which a correction of the target bit is made based on both data preceding the target bit and data succeeding the target bit, i.e., both past and future data in time with respect to the target bit.

In FIG. 8, the decision circuit 9 includes the amplitude detecting circuit 20 which is the same as that shown in FIG. 4, and also includes a shift register 82. The correction value generating circuit 11 includes a decoder circuit 83 and a memory 84. In this embodiment, the possible values of the run length of the symbol "0" are 0, 1 and 2. The data input terminal 40 receives an output x from the equalizer 7 (FIG. 1) while the threshold input terminal 41 receives threshold levels "a" and "−a". In the amplitude detecting circuit 20, as mentioned before, if the incoming sampled data meets the condition, −a≦x≦a, indicating the symbol "0", then a high level signal is issued. If the incoming sampled data meets the condition, x>a or x<−a, indicating the symbol "1" or "−1", then a low level signal is issued. These level signals are sequentially stored into the shift register 82. The shift register 82 is adapted to store five bits in total, including two past bits, a current bit, and two future bits. This corresponds to the fact that the maximum value of the run length of "0" is 2 in this embodiment. If the maximum value is changed, the number of bits of the shift register 82 would change in connection therewith. Upon receipt of the resultant output of the shift register 82, the decoder circuit 83 generates an address number to be applied to the memory 84. The memory 84 contains correction values b0–b4 (b0>b1>b2>b3>b4) in correspondence with addresses "0" to "4", and also contains a correction value "0" which corresponds to an address "5". The memory 84 outputs one of the correction values in response to the address output from the decoder circuit 83. The delay circuit 10 (FIG. 1) delays the output x of the equalizer 7 so that the equalizer output corresponds in time to the bit data positioned at the center bit 0 of the shift register 82. The operation circuit 12 (FIG. 1) adds the correction value to the delayed data to correct the same.

Referring to FIG. 9, an explanation will be given with respect to the way of determining the address number in the decoder circuit 83. In FIG. 9, all of the combinations of values of the bit data stored in the shift register 82 are listed with corresponding address values. The address number for each combination is determined as follows. In a case where the current bit (0) is at low (L), the address number to be obtained is defined by the sum of first and second values which are derived from the past part (bits (−1) and (−2)) and the future part (bits (+1) and (+2)), respectively, of the data in the register 82. If the past bits (−1) and (−2) are both at high (H), the first value is 2. If the bit (−1) is at high and the bit (−2) is at low, then the first value is 1. If the bit (−1) is at low, the first value is 0. Similarly, if the future bits (+1) and (+2) are both at high, then the second value is 2. If the bit (+1) is at high and the bit (+2) is at low, then the second value is 1. If the bit (+1) is at low, the second value is 0. The sum of the first and second values makes the address number of that combination of the bit data in the shift register 82. If the current bit (0) is at high, an address number "5" is selected, which means that no correction is made to the current bit.

Now, it will briefly be explained how the correction values corresponding to the run length of "0" are determined in the second embodiment. In this embodiment, test data becomes somewhat complicated as compared with that shown in FIG. 13 so as to meet the arrangement in which the correction value is derived from the run lengths of "0" before and after the target symbol "0". However, the basic idea for determining the correction values is the same.

Thus, second embodiment enables the correction to use the run lengths of "0" preceding and succeeding in time a target bit of the symbol "1" or "−1" (i.e., past and future bit data). This assures an accurate correction of the interference, reducing the discrimination errors in the data discrimination circuit at the following stage. The decoder circuit 83 and the memory 84 may be constructed such that all the different patterns of bit data stored in the shift register 82 are assigned with their individual address numbers and correction values, thereby assuring more accurate correction of the interference to reduce the discrimination errors.

Figure 10:
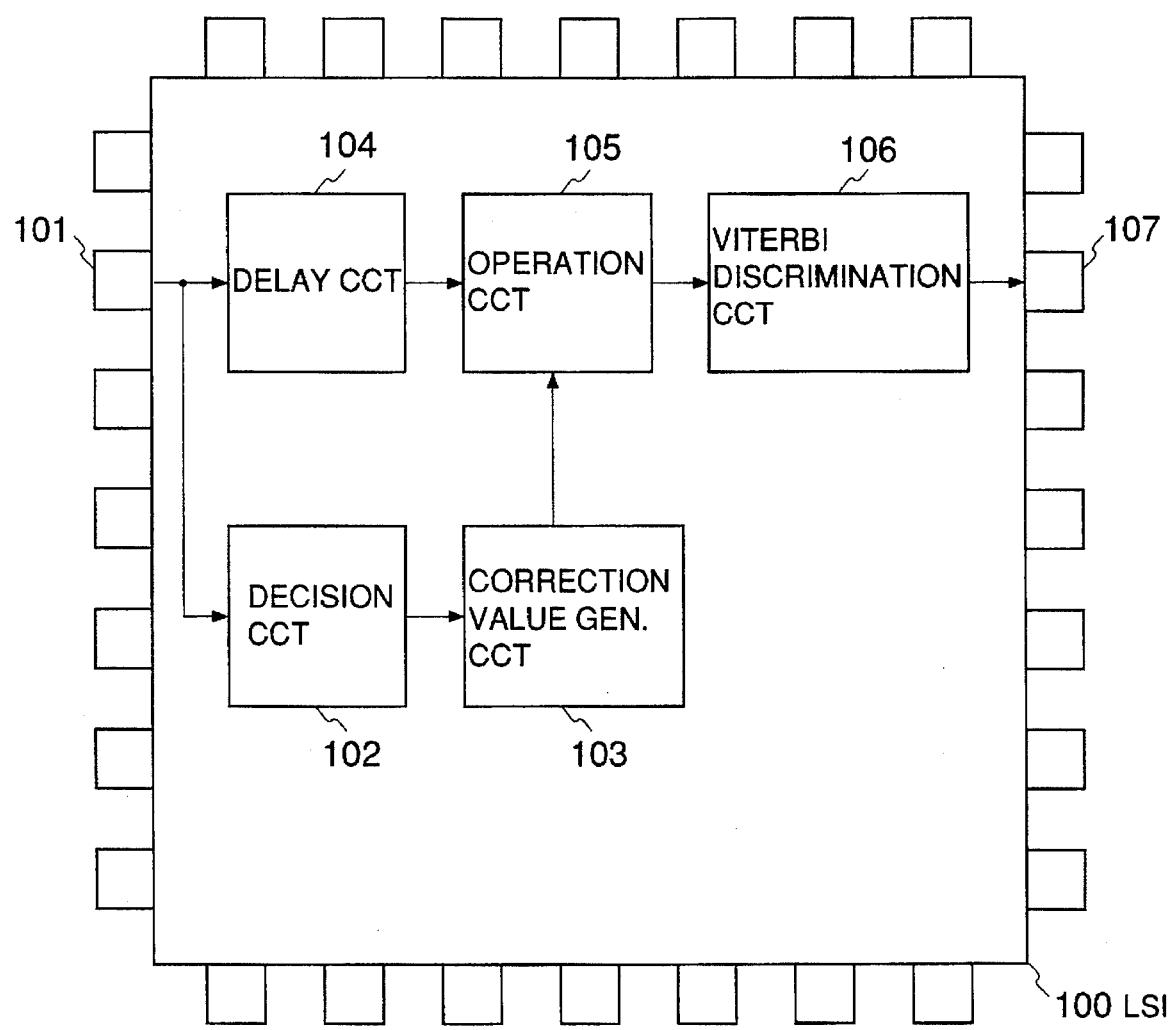
FIG. 10 shows a block diagram of an LSI which includes a Viterbi discrimination circuit provided with a decision capability and a correction capability.
Figure 11:
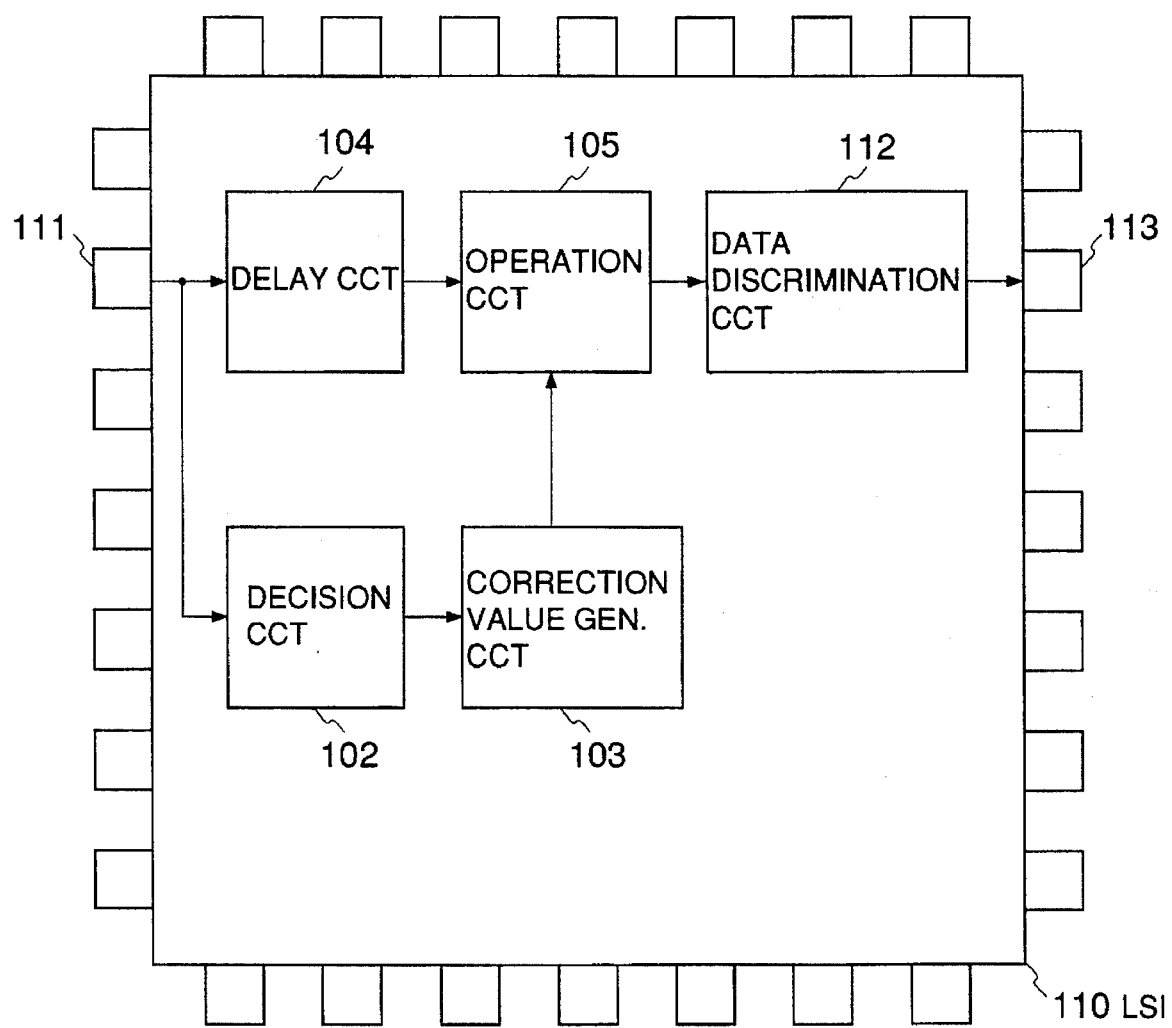
FIG. 11 shows a block diagram of another LSI which includes a data discrimination circuit provided with a decision capability and a correction capability.

Referring now to FIGS. 10 and 11, an explanation will be made with respect to exemplary constructions of the data discrimination apparatus in the form of a large-scaled integrated circuit (LSI) which has the decision capability of preliminarily classifying bit data and the correction capability of correcting input data based on the result of the decision as described in the first and second embodiments.

FIG. 10 shows a block diagram depicting the structure of an LSI which includes the Viterbi discrimination circuit with the decision capability of preliminarily classifying bit data and the correction capability of correcting input data based on the result of the decision. An LSI 100 includes a data input terminal 101, a decision circuit 102, a correction value generating circuit 103, a delay circuit 104, an operation circuit 105, a Viterbi discrimination circuit 106, and a data output terminal 107. The Viterbi discrimination circuit may be of a conventional type. The elements 102–105 are all described above with respect to the first and second embodiments, and hence their detailed explanations with regard to construction and operation will be omitted.

FIG. 11 shows a block diagram depicting the structure of an LSI which includes the data discrimination circuit 112, such as a level slice circuit, with the decision capability of preliminarily classifying bit data and the correction capability of correcting input data based on the result of the decision. An LSI 110 includes a data input terminal 111, a decision circuit 102, a correction value generating circuit 103, a delay circuit 104, an operation circuit 105, a data discrimination circuit 112 such as the level slice circuit, and a data output terminal 113. The operation of this LSI 110 is substantially the same as the LSI 100 shown in FIG. 10.

According to the third embodiment shown in FIGS. 10 and 11, there are provided a Viterbi discrimination LSI and data discrimination LSI which includes the conventional Viterbi discrimination circuit and data discrimination circuit such as the level slice circuit, respectively, together with the decision circuit and the correction value generating circuit. These are data-pattern-independent data discrimination LSIs which require no modification of external circuits.

Figure 12:
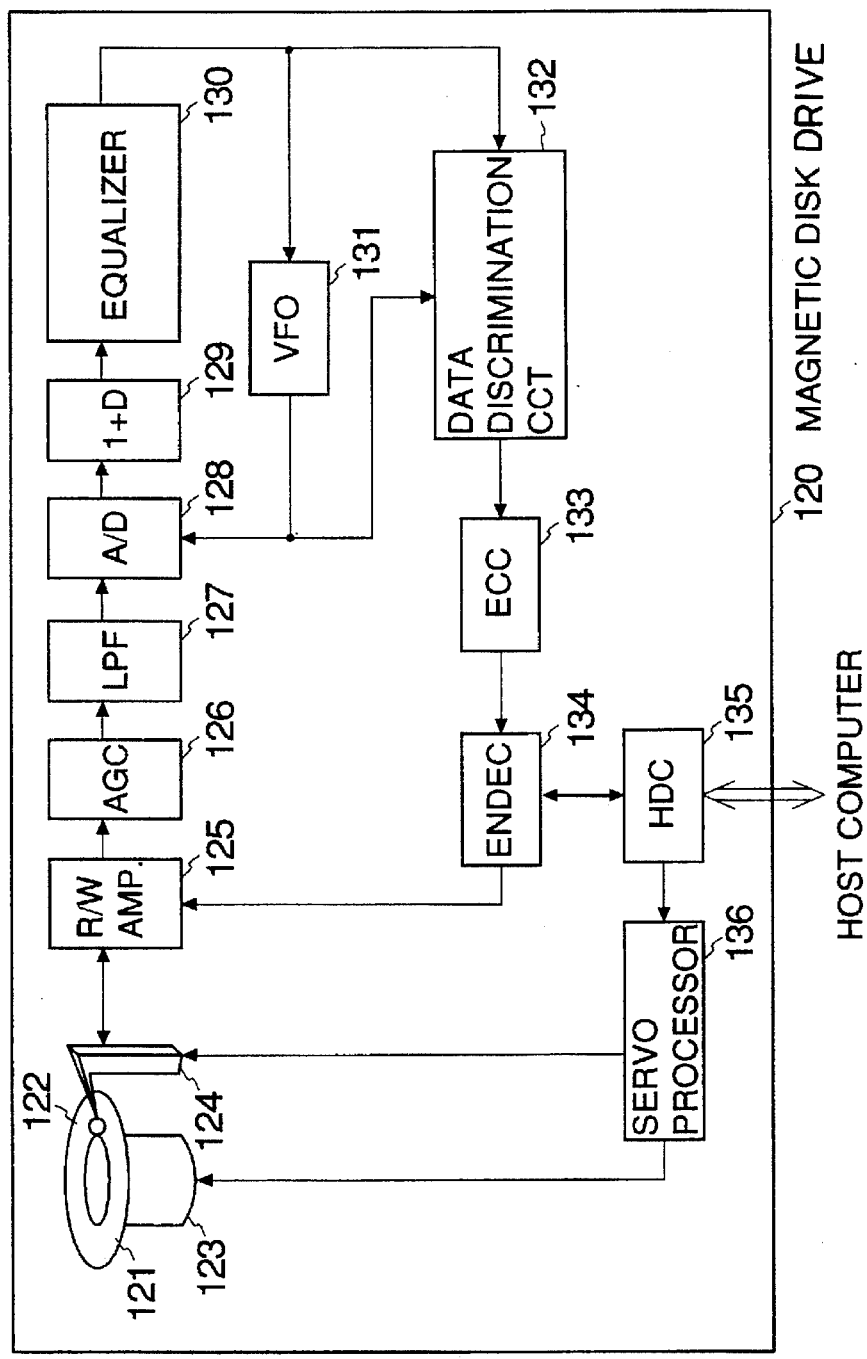
FIG. 12 shows a block diagram of a magnetic disk drive which employs the data discrimination LSI shown in FIG. 10 or 11.

Referring to FIG. 12, there is shown a construction of a magnetic disk drive to which the data discrimination LSI shown in FIG. 10 or 11 is applied. A magnetic disk drive 120 includes a recording medium 121, a magnetic head 122, a spindle motor 123, a voice-coil motor (VCM) 124, a read/write amplifier (R/W AMP) 125, an automatic gain control circuit (AGC) 126, a low-pass filter (LPF) 127, an analog-to-digital converter (A/D) 128, a (1+D) operation circuit 129, an equalizer 130, a variable frequency oscillator (VFO) 131, a data discrimination circuit 132, an error correction circuit (ECC) 133, an encoder/decoder (ENDEC) 134, a hard disk controller (HDC) 135, and a servo processor 136.

Upon receipt of a read command from a host computer, the HDC 135 activates the VCM 124 via the servo processor 136 so as to move the magnetic head to be positioned on a target cylinder. The magnetic head 122 reads data out from the recording medium 121. The read out data is sequentially processed in the elements 125 through 131, and is then data discriminated in the data discrimination circuit 132. The resultant output of the discrimination circuit 132 is then processed in the ECC 133, decoded in the ENDEC 134, and passed to the HDC 135, which will in turn return the data to the host computer.

As described with reference to FIG. 12, by employing the LSI shown in FIG. 10 or 11 in the magnetic disk drive, the data discrimination errors will be reduced to thereby improve the reliability of the apparatus. The data discrimination LSI of the invention offers no change in input/output conditions for the external circuits such as the equalizer and the ECC, eliminating the need for designing such dedicated circuits and having no influence on the man hours required to design the magnetic disk drive.

Although the LSI includes only the data discrimination apparatus, it may further include therein the (1+D) operation circuit 129, equalizer circuit 130, VFO 131 and ECC 133.

As described above, according to the present invention, it is possible, in a digital data recording/reproducing apparatus such as a high-density magnetic disk drive, to obtain a correction value for correcting the inter-symbol interference in a bit-by-bit manner based on data patterns in the equalizer output. Also, it is possible to correct data of a bit which has just been used as a target bit for obtaining the correction value. As a result, changes in the amount of interference depending upon the data patterns in high-density recording can be cancelled, while increasing the amplitude of data through the correction, to thereby improve the S/N ratio of the data, hence reducing discrimination errors at the data discrimination circuit. Further, the performance of the data discrimination is enhanced by the LSI, which includes the data discrimination circuit such as the Viterbi or data discrimination circuit, together with the means for correction, without changing the interface with the external circuits. In addition, the digital data recording/reproducing apparatus employing this data discrimination apparatus will attain an improved performance of the apparatus.

What is claimed is:

1. A data discrimination apparatus for outputting a bit stream including logical "1" and "0" in response to an input signal representative of bi-level data, said data discrimination apparatus comprising:

a decision circuit for detecting an amplitude of the input signal at regular sampling intervals so as to preliminarily classify, based on the detected amplitude, each of sampled parts of the input signal into one of a symbol "1", indicative of a large amplitude part, and a symbol "0", indicative of a small amplitude part for deciding, for a pertinent sampled part being symbol "1", whether each of a predetermined sampled part is symbol "1" or "0";

a correction value generation circuit responsive to an output of the decision circuit for generating one of a number of correction values of an amplitude of the input signal, the correction values being predetermined corresponding to different combinations of the symbols of the predetermined number of sampled parts;

a delay circuit for delaying the input signal by a predetermined time;

an operation circuit for adding, to the input signal delayed by the delay circuit, a signal indicative of one of the correction values generated from the correction value generating circuit; and a discrimination circuit responsive to an output of the operation circuit for discriminating the input signal so as to output the bit stream including logical "1" and "0";

wherein said decision circuit includes an amplitude detecting circuit for detecting an amplitude of the input signal so as to output a train of the symbols "1" and "0", and a counter circuit for counting, as a run length, the number of consecutive symbol "0"s which precedes in time each symbol "1" contained in the train of the symbols, and wherein said correction value generating circuit includes a memory device for storing the correction values in correspondence with possible different values of the run length obtained by the counter circuit.

2. A data discrimination apparatus according to claim 1, wherein said discrimination circuit includes a level slice circuit for performing data discrimination directly based on an amplitude level of an output of the operation circuit.

3. A data discrimination apparatus according to claim 1, wherein said operation circuit includes a sign detecting circuit for detecting a sign of the sampled part of the input signal, and a complement circuit for substantially inverting a sign of a given one of the correction values.

4. A data discrimination apparatus according to claim 1, wherein the correction values stored in said memory device are errors between amplitude values of the sampled parts indicated by the symbol "1" and their corresponding correct amplitude values, which are actually measured with respect to all possible values of the run length of the symbol "0".

5. A data discrimination apparatus according to claim 1, wherein each of the circuits included in said data discrimination apparatus are contained in a single large-scaled integrated circuit.

6. A data discrimination apparatus for outputting a bit stream including logical "1" and "0" in response to an input signal representative of bi-level data, said data discrimination apparatus comprising:

a decision circuit for detecting an amplitude of the input signal at regular sampling intervals so as to preliminarily classify, based on the detected amplitude, each of sampled parts of the input signal into one of a symbol "1", indicative of a large amplitude part, and a symbol "0", indicative of a small amplitude part, and for deciding, for a pertinent sampled part being symbol "1", whether each of a predetermined sampled part is symbol "1" or "0";

a correction value generation circuit responsive to an output of the decision circuit for generating one of a number of correction values of an amplitude of the input signal, the correction values being predetermined corresponding to different combinations of the symbols of the predetermined number of sampled parts;

a delay circuit for delaying the input signal by a predetermined time;

an operation circuit for adding, to the input signal delayed by the delay circuit, a signal indicative of one of the correction values generated from the correction value generating circuit; and a discrimination circuit responsive to an output of the operation circuit for discriminating the input signal so as to output the bit stream including logical "1" and "0";

wherein said decision circuit includes an amplitude detecting circuit for detecting an amplitude of the input signal so as to output a train of the symbols "1" and "0", and a shift register for obtaining, as a data pattern, a predetermined number of the symbols which precede and succeed, in time, each symbol "1" contained in the train of the symbols and wherein said correction value generating circuit includes a memory device for storing the correction values in correspondence with possible different data patterns obtained in the shift register.

7. A data discrimination apparatus according to claim 6, wherein the correction values stored in said memory device are errors between amplitude values of the sampled parts indicated by the symbol "1" and their corresponding correct amplitude values, which are actually measured with respect to all possible data patterns including combinations of the symbols "1" and "0".

8. A data discrimination apparatus for outputting a bit stream including logical "1" and "0" in response to an input signal representative of bi-level data, said data discrimination apparatus comprising:

a decision circuit for detecting an amplitude of the input signal at regular sampling intervals so as to preliminarily classify, based on the detected amplitude, each of sampled parts of the input signal into one of a symbol "1", indicative of a large amplitude part, and a symbol "0", indicative of a small amplitude part, and for deciding, for a pertinent sampled part being symbol "1", whether each of a predetermined sampled part is symbol "1" or "0";

a correction value generation circuit responsive to an output of the decision circuit for generating one of a number of correction values of an amplitude of the input signal, the correction values being predetermined corresponding to different combinations of the symbols of the predetermined number of sampled parts;

a delay circuit for delaying the input signal by a predetermined time;

an operation circuit for adding, to the input signal delayed by the delay circuit, a signal indicative of one of the correction values generated from the correction value generating circuit: and a discrimination circuit responsive to an output of the operation circuit for discriminating the input signal so as to output the bit stream including logical "1" and "0";

wherein said discrimination circuit is a Viterbi discrimination circuit which performs a Viterbi decoding with respect to an output of the operation circuit.

9. A magnetic disk drive, comprising:

a recording medium on which a digital signal is recorded;

a magnetic head for reading out a signal recorded on said recording medium;

a pre-amplifier for amplifying a signal which has been read out by said magnetic head;

an analog-to-digital converter for sampling and digitizing a signal which has been amplified by said pre-amplifier;

a pre-processing circuit for performing pre-processing of a Viterbi decoding, with respect to an output of said analog-to-digital converter;

an equalizing circuit for shaping a waveform of an output of said pre-processing circuit; and a data discrimination apparatus for outputting a bit stream including logical "1" and "0" in response to an output of said equalizing circuit, wherein said data discrimination apparatus comprises:

a decision circuit for detecting an amplitude of the output of said equalizing circuit at regular sampling intervals so as to preliminarily classify, based on the detected amplitude, each of sampled parts of the output of said equalizing circuit into one of a symbol "1", indicative of a large amplitude part, and a symbol "0" indicative of a small amplitude part, and for deciding, for a pertinent sampled part being symbol "1", whether each of a predetermined number of sampled parts at least preceding in time the pertinent sampled part is symbol "1" or "0", a correction value generation circuit responsive to an output of the decision circuit for generating one of a number of correction values of an amplitude of the output of said equalizing circuit, the correction values being predetermined corresponding to different combinations of the symbols of the predetermined number of sampled parts, a delay circuit for delaying the output of said equalizing circuit by a predetermined time, an operation circuit for adding, to the output of said equalizing circuit delayed by the delay circuit, a signal indicative of one of the correction values generated from the correction value generating circuit, and a discrimination circuit responsive to an output of the operation circuit for discriminating the output of said equalizing circuit so as to output the bit stream including logical "1" and "0", said discrimination circuit being a Viterbi discrimination circuit which performs a Viterbi decoding with respect to an output of the operation circuit.

10. A magnetic disk drive, comprising:

a recording medium on which a digital signal is recorded;

a magnetic head for reading out a signal recorded on said recording medium;

a pre-amplifier for amplifying a signal which has been read out by said magnetic head;

an analog-to-digital converter for sampling and digitizing a signal which has been amplified by said pre-amplifier;

an equalizing circuit for shaping a waveform of an output of said analog-to-digital converter; and a data discrimination apparatus for outputting a bit stream including logical "1" and "0" in response to an output of said equalizing circuit, wherein said data discrimination apparatus comprises:

a decision circuit for detecting an amplitude of the output of said equalizing circuit at regular sampling intervals, for preliminary classifying, based on the detected amplitude, each of sampled parts of the output of aid equalizing circuit into one of a symbol "1", indicative of a large amplitude part, and a symbol "0", indicative of a small amplitude part, and for deciding, for a pertinent sampled part classified as symbol "1", whether each of a predetermined number of sampled parts preceding in time the pertinent sampled part has been classified into symbol "1" or "0", a memory device for storing correction values of an amplitude in correspondence with possible different combinations of the symbols of the predetermined number of sampled parts preceding in time the pertinent sampled part classified as symbol "1", a correction value generation circuit for generating one of the correcting values, for the pertinent sampled part classified as symbol "1", corresponding to a combination of the symbols of the predetermined number of sampled parts preceding in time the pertinent sampled part classified as symbol "1", referring to said memory device, a delay circuit for delaying the output of said equalizing circuit by a predetermined time, an operation circuit for adding, to the amplitude of the pertinent sampled part classified as symbol "1" of the output of said delay circuit, the correction value for the pertinent sampled part classified as symbol "1", generated by the correction value generating circuit, and a discrimination circuit responsive to an output of the operation circuit for discriminating the output of the equalizing circuit, and for outputting the bit stream including logical "1" and "0".

11. A magnetic disk drive according to claim 10, wherein said decision circuit includes an amplitude detecting circuit for detecting an amplitude of the output of said equalizing circuit so as to output a train of the symbols "1" and "0", and a counter circuit for counting, as a run length, the number of consecutive symbol "0"s which precedes in time each symbol "1" contained in the train of the symbols, and wherein said memory device stores the correction values in correspondence with possible different values of the run length obtained by the counter circuit.

12. A magnetic disk drive according to claim 11, wherein the correction values stored in said memory device are errors between amplitude values of the sampled parts indicated by the symbol "1" and their corresponding correct amplitude values, which are actually measured with respect to all possible values of the run length of the symbol "0".

13. A magnetic disk drive according to claim 10, wherein said decision circuit includes an amplitude detecting circuit for detecting an amplitude of the output of said equalizing circuit so as to output a train of symbols "1" and "0", and a shift register for obtaining, as a data pattern, a predetermined number of the symbols which precede and succeed, in time, each symbol "1" contained in the train of the symbols and wherein said memory device stores the correction values in correspondence with possible different data patterns obtained in the shift register.

14. A magnetic disk drive according to claim 13, wherein the correction values stored in said memory device are errors between amplitude values of the sampled parts indicated by the symbol "1" and their corresponding correct amplitude values, which are actually measured with respect to all possible data patterns including combinations of the symbols "1" and "0".

15. A magnetic disk drive according to claim 10, wherein said discrimination circuit includes a level slice circuit for performing data discrimination directly based on an amplitude level of an output of the operation circuit.

16. A magnetic disk drive according to claim 10, wherein said operation circuit includes a sign detecting circuit for detecting a sign of the sampled part of the output of said equalizing circuit, and a complement circuit for substantially inverting a sign of a given one of the correction values.

17. A magnetic disk drive according to claim 10, wherein each of the circuits included in said data discrimination apparatus are contained in a single large-scaled integrated circuit.

* * * * *